Patented Dec. 29, 1942

2,306,586

UNITED STATES PATENT OFFICE 2,306,586

POLYVINYL ACETAL RESIN AND COMPOSITION THEREOF

Kenneth Guy Blaikie and Robert Nelson Crozier, Shawinigan Falls, Quebec, Canada, assignors to Shawinigan Chemicals Limited, Montreal, Quebec, Canada, a corporation of Canada No Drawing. Original application August 13, 1937, Serial No. 159,016. Divided and this application May 16, 1939, Serial No. 274,044

3 Claims. (Cl. 260—73)

This invention relates to polyvinyl acetal resins having heat and exposure resistant properties and the application is a division of application Serial No. 159,016, filed August 13, 1937, which has matured into Patent 2,166,856.

It is well known that partially and completely hydrolyzed polyvinyl esters condense with aldehydes to produce polyvinyl acetal resins having a wide variety of properties.

These resins are adapted to many different uses. They may be dissolved in solvents in the manufacture of lacquers, paints, coatings, adhesives and the like. In the solid state they may be moulded or pressed into shaped bodies of various kinds and are now taking a leading position in the plastics field.

However, polyvinyl acetal resins have been unsatisfactory in some respects, because they become unstable on prolonged heating at temperatures above 130° C. In the manufacture of moulded articles where the resins are subjected to relatively high temperatures on steam-heated rolls during the incorporation of plasticizers, fillers, dyes, etc., and also during the actual moulding operations where temperatures up to 150° C. are employed, the resins become dis-coloured, insoluble and otherwise deteriorated. Consequently, in order to enlarge their field of usefulness it is necessary that these resins be rendered sufficiently stable to withstand the temperature conditions encountered in the commercial moulding industry.

Therefore, the main object of the present invention is to provide a polyvinyl acetal resin composition practically stable to the conditions of heat and exposure encountered during its manufacture into commercial articles.

Another object is to provide a product of this nature which is readily produced from economically available materials.

The principal feature of the invention comprises incorporating in polyvinyl acetal resins a small quantity of a substance capable of rendering them stable. This stabilizing agent is added preferably before carrying out the hydrolysis of the polyvinyl ester, but additions may be made during or after the hydrolysis reaction. This invention is not restricted to any particular means of incorporating the stabilizer into the resin.

The substances which we have found to be most useful as a stabilizer for polyvinyl acetal resins is para-tertiary-amyl-phenol and/or certain derivatives and certain alkyl substitution products thereof. The present application relates to the use of para-tertiary-amyl-phenol while co-pending application Serial No. 159,016 is devoted to the use of condensation products thereof with aldehydes.

Stabilizers are known which may be quite effective for materials such as rubber, oils, and others, but absolutely valueless for use in polyvinyl acetal resins. For instance, there are a number of stabilizers in rubber and allied industries which are suitable for the present purpose owing to the fact that they are stable to conditions of heat and light and that the majority of them are coloured or impart colour to the resin. The present invention is the first instance of a suitable stabilizing agent for polyvinyl acetal resins.

EXAMPLES

The following examples illustrate the invention but it is understood that the invention is not limited to the particular polyvinyl acetal resins and the concentration of the stabilizers set out in these examples. For convenience the letters "P. T. A. P." have been used to indicate "para-tertiary-amyl phenol."

EXAMPLE 1

Resin No. 1

10 gms. of polyvinyl acetate of viscosity 17.8 centipoises is dissolved in 30 gms. of 95% ethyl alcohol. Five cc. of paraldehyde and 2.21 cc. of concentrated HCl are added and the temperature held at 40° C. for 100 hours with constant stirring. The resin is precipitated with water, thoroughly washed and dried below 100° C. in a stream of air.

Resin No. 2

The same procedure as for Example 1, resin No. 1, except that 0.2 gm. of P. T. A. P. is incorporated into the reaction mixture before hydrolysis.

Samples of resins No. 1 and No. 2 were heated in air at 145° C. for the following periods of time and with the following results:

| Time heated | Resin No. 1 | Resin No. 2 |
|---|---|---|
| 0 | Colourless—fibrous | Colourless—fibrous. |
| 2 hrs | Slight colour—sintered | No change. |
| 4 hrs | Straw-coloured—fused | Practically no change. |
| 6 hrs | Yellow-coloured—completely fused. | Faint yellow tinge—not completely fused. |

Resin 2 is exceedingly stable and shows practically no signs of deterioration or development of colour after four hours' heating in air at 145° C. Resin 1, on the other hand, containing no stabilizer, commences to show colour after heating for two hours.

EXAMPLE 2

2000 gms. of polyvinyl acetate of viscosity 17.8 centipoises were dissolved in 5000 gms. of 95% methylated spirits. To this solution was added 1000 gms. of paraldehyde and 500 gms. of concentrated hydrochloric acid dissolved in 1000 gms. of 95% methylated spirits, after which the reaction was carried out at 40° C. for 53 hours. The resin was finally precipitated by water, thoroughly washed and dried in air below 100° C.

A weighed quantity of the resin was dissolved in alcohol to give a 15% solution. The stabilizing agent was mixed with the solution and the resin plus stabilizer precipitated together, washed and dried in a stream of air. The following samples were prepared:

A. Resin with no added material.
B. Resin plus 0.5% P. T. A. P.

The resin and resin plus added stabilizer were heated in air for several hours at 145° C. with the following results:

| | Time at 145° C. | Saponification value | Viscosity | Colour |
|---|---|---|---|---|
| | Hours | | | |
| A. Blank, i. e., resin alone. | 0 | 15.0 | 4.4 | Colourless. |
| Do. | 3 | 17.1 | 2.5 | Yellow. |
| B. Resin plus P. T. A. P. | 3 | 15.4 | 3.5 | Practically colourless. |

The resin and resin plus stabilizer were heated in air at 110° C. up to five days.

| Time at 110° C. | Saponification value | Viscosity | Colour |
|---|---|---|---|
| A. 0 | 15.0 | 4.4 | Colourless. |
| 1 day | 15.7 | 3.1 | Very slight. |
| 2 days | 18.0 | 2.1 | Slight yellow. |
| 3 days | 20.2 | 1.8 | Yellow. |
| 5 days | 21.3 | 1.9 | Yellowish-brown. |
| B. 0 | 15.0 | 4.4 | Colourless. |
| 1 day | 15.2 | 3.7 | Do. |
| 2 days | 15.8 | 3.2 | Do. |
| 3 days | 18.4 | 2.1 | Slight yellow. |
| 5 days | 20.4 | 1.8 | Brownish-yellow. |

Resin B is an exceedingly stable body. After two days' heating at 110° C. practically no change in colour takes place. The saponification value and the viscosity, which are direct indications of the effect of oxygen on the resin, show that oxidation has not proceeded to any great extent in B.

Stable resins are also made by the herein described process, by condensing polyvinyl esters with aldehydes other than those described in the above examples or with a mixture of two or more aldehydes either successively or sequentially, such as employed in the mixed resins described in the copending application which matured to Patent No. 2,116,635. Furthermore, acetalization catalysts other than hydrochloric acid may be used, such as zinc chloride or calcium chloride, but it has been found when using sulphuric acid as catalyst no pronounced improvement in the stability of the resultant resin is obtained.

In the present specification and claims "stable" means "sufficiently firmly established in colour value, saponification value, and viscosity, for these factors to remain constant, for all practical purposes, under the conditions of heat and temperature to which the resinous product is ordinarily subjected during its manufacture into commercial moulded articles."

It will also be understood that these examples employ temperature conditions and time factors which are considerably more extreme than the actual conditions that would be met by the resinous products in commercial practice.

We claim:

1. A resinous composition comprising a polyvinyl acetal resin being the condensation product of a hydrolyzed polyvinyl ester and an aldehyde in which the hydrolysis and condensation were carried out in the presence of hydrochloric acid as a catalyst at a temperature of 40° C. and whose colour is normally unstable to heat, and para-tertiary-amyl phenol as a stabilizing inhibitor of discoloration in proportions of substantially 0.20% to 1.50% of the polyvinyl acetal, said para-tertiary-amyl phenol being effective to prevent discoloration of the resin when subjected to a temperature up to 145° C. for a time up to three hours, the amount of para-tertiary-amyl phenol in the composition being insufficient to plasticize or to add its own colour to the resin.

2. A process of making a resinous composition, comprising, incorporating with a polyvinyl ester hydrolyzed in the presence of hydrochloric acid as a stabilizing inhibitor of discoloration between about 0.20% and 1.50% of para-tertiary-amyl phenol and condensing the polyvinyl ester and an aldehyde in the presence of the acid and inhibitor at a temperature of 40° C. to form a polyvinyl acetal, the amount of para-tertiary-amyl phenol added being insufficient to plasticize the resin.

3. A process of stabilizing a polyvinyl acetal resin being the product of a polyvinyl ester hydrolyzed and reacted with an aldehyde in the presence of hydrochloric acid at a temperature of 40° C. comprising incorporating in the resin as a stabilizing inhibitor of discoloration, a quantity of para-tertiary-amyl phenol between about 0.20% and 1.50% of the composition, the amount of para-tertiary-amyl phenol added being insufficient to plasticize or to add its own colour to the resin.

KENNETH GUY BLAIKIE.
ROBERT NELSON CROZIER.